United States Patent
Lee

(10) Patent No.: US 7,606,154 B1
(45) Date of Patent: Oct. 20, 2009

(54) FAIR BANDWIDTH ALLOCATION BASED ON CONFIGURABLE SERVICE CLASSES

(75) Inventor: Chung-Chieh Lee, Long Grove, IL (US)

(73) Assignee: Juniper Networks, Inc., Sunnyvale, CA (US)

( * ) Notice: Subject to any disclaimer, the term of this patent is extended or adjusted under 35 U.S.C. 154(b) by 925 days.

(21) Appl. No.: 10/816,378

(22) Filed: Apr. 1, 2004

(51) Int. Cl.
H04J 3/14 (2006.01)
H04L 12/56 (2006.01)

(52) U.S. Cl. ........... 370/232; 370/412
(58) Field of Classification Search ........... 370/395.21, 370/395.41, 395.4, 395.42, 395.43, 412, 370/429, 252, 253, 229, 468, 232
See application file for complete search history.

(56) References Cited

U.S. PATENT DOCUMENTS

| | | | | |
|---|---|---|---|---|
| 4,167,786 A * | 9/1979 | Miller et al. | ............... | 700/295 |
| 4,213,182 A * | 7/1980 | Eichelberger et al. | ....... | 700/296 |
| 5,748,615 A * | 5/1998 | Riedel et al. | ............. | 370/230.1 |
| 6,047,309 A * | 4/2000 | Dan et al. | ................... | 709/201 |
| 6,122,254 A * | 9/2000 | Aydemir et al. | ............. | 370/235 |
| 6,185,188 B1 * | 2/2001 | Hasegawa | ................... | 370/235 |
| 6,198,724 B1 * | 3/2001 | Lam et al. | ................... | 370/233 |
| 6,456,590 B1 * | 9/2002 | Ren et al. | ................... | 370/229 |
| 6,563,829 B1 * | 5/2003 | Lyles et al. | ............ | 370/395.21 |
| 6,982,960 B2 * | 1/2006 | Lee et al. | ................... | 370/254 |
| 7,065,582 B1 * | 6/2006 | Dwork et al. | ............... | 709/234 |
| 7,099,275 B2 * | 8/2006 | Sarkinen et al. | ............. | 370/230 |
| 7,120,160 B2 * | 10/2006 | Takase et al. | ............... | 370/415 |
| 7,177,274 B2 * | 2/2007 | Van Der Zee et al. | ....... | 370/230 |
| 7,187,669 B1 * | 3/2007 | Lee | ............. | 370/347 |
| 7,274,696 B1 * | 9/2007 | Sikdar | ........................ | 370/391 |
| 7,277,394 B2 * | 10/2007 | Hester et al. | ................. | 370/238 |
| 7,296,083 B2 * | 11/2007 | Barham et al. | .............. | 709/232 |

| | | | | |
|---|---|---|---|---|
| 2001/0053152 A1 * | 12/2001 | Sala et al. | ................... | 370/412 |
| 2002/0136200 A1 * | 9/2002 | St. John | ...................... | 370/352 |
| 2002/0154649 A1 * | 10/2002 | Takase et al. | ............... | 370/412 |

(Continued)

FOREIGN PATENT DOCUMENTS

WO    WO 02076028 A1 *    9/2002

(Continued)

OTHER PUBLICATIONS

End-node-based congestion-aware network load balancing; Teruhi, S. Uematsu, Y.; NTT Network Service Syst. Labs., NTT Corp., Tokyo, Japan; This paper appears in: Communications, 2004 IEEE International Conference on Publication Date: Jun. 20-24, 2004; vol. 4, On pp. 2174-2178 vol. 4.*

(Continued)

*Primary Examiner*—Edan Orgad
*Assistant Examiner*—Salman Ahmed
(74) *Attorney, Agent, or Firm*—Shumaker + Sieffert, P.A.

(57) ABSTRACT

A network device utilizes fair bandwidth allocation techniques based on configurable service classes. The network device comprises a scheduler that receives a packet associated with a service flow for delivery to a destination. The scheduler identifies a service credit associated with the service flow that represents a bandwidth allocation available for consumption by an associated service flow. Based on the identified service credit, the downstream scheduler assigns the packet to one of a plurality of hold queues. The number of hold queues may remain static during the allocation of bandwidth, which reduces the complexity of the scheduler and permits fair bandwidth allocation to occur. Such a queuing architecture also allows the downstream scheduler to achieve rate limiting and minimum bandwidth guarantee without using separate algorithms and/or architectures.

61 Claims, 9 Drawing Sheets

U.S. PATENT DOCUMENTS

| | | | |
|---|---|---|---|
| 2002/0176358 A1* | 11/2002 | Assa et al. | 370/229 |
| 2003/0128707 A1* | 7/2003 | Kalkunte et al. | 370/395.41 |
| 2007/0008884 A1* | 1/2007 | Tang | 370/230 |
| 2007/0115843 A1* | 5/2007 | Bader | 370/252 |

FOREIGN PATENT DOCUMENTS

| | | | |
|---|---|---|---|
| WO | WO2004102984 A2 * | 11/2004 | |

OTHER PUBLICATIONS

Load balancing routing with bandwidth-delay guarantees; Gopalan, K.; Tzi-cker Chiueh; Yow-Jian Lin; Communications Magazine, IEEE; vol. 42, Issue 6, Jun. 2004 pp. 108-113.*

Load balancing via relay in next generation wireless systems; Chunming Qiao; Hongyi Wu; Tonguz, 0.; Mobile and Ad Hoc Networking and Computing, 2000. MobiHOC. 2000 First Annual Workshop on Aug. 11, 2000 pp. 149-150.*

H. Zhang, "Service Disciplines for Guaranteed Performance Service in Packet Switching Networks," Proceedings of the IEEE, vol. 83, No. 10, Oct. 1995, pp. 1374-1396.

C.C. Lee and A.H. Haddad, "QoS-Guided Bandwidth Management in Differentiated Time Scales," (with Abraham H. Haddad), Journal of Optimization Theory & Applications, vol. 115, No. 3, Dec. 2002, pp. 517-547.

L. Kalampoukas, A. Varma, and K.K. Ramakrishnan, "Explicit Window Adaptation: A Method to Enhance TCP Performance," Proceedings INFOCOM '98, vol. 1, Apr. 1998. (The Base of Packeteer's TCP Traffice Shaping), pp. 242-251.

"Dynamics of TCP/RED and a Scalable Control," S.H. Low, F. Paganini, J. Wang, S. Adlakha, and J.C. Doyle, *Proc. 2002 IEEE INFOCOM*, New York, NY, Jun. 23-27, 2002, vol. 1 of 3, pp. 239-248.

* cited by examiner

FAIR BANDWIDTH ALLOCATION BASED ON CONFIGURABLE SERVICE CLASSES

TECHNICAL FIELD

The invention relates to networks, and more particularly, to devices within networks that support queuing of data communications.

BACKGROUND

Cable networks were originally developed to facilitate the distribution of television broadcasts. Cable networks generally use coaxial cables as transmission lines for the dissemination of television broadcasts to various homes, businesses or other destinations. Cable networks were designed to support one-way communication of broadcast signals from a broadcast center to a number of television nodes connected to the cable network.

The "Internet" is a well-known term that refers to a collection of data networks that utilize layered protocols to route data packets to various locations around the world. The Internet carries and processes data traffic in Internet Protocol (IP) packets, each of which contains source and destination IP addresses, and other control information, along with a segment of user data (sometimes referred to as the payload). As such, computers use the Internet to communicate data in IP packets, and process IP packets in accordance with certain protocol.

The emergence of the Internet has prompted the desire to allow cable networks to support two-way packet-based data communication. This desire has resulted in standards and protocols that enable network infrastructure conventionally used for the distribution of cable television broadcasts to deliver Internet service to homes, businesses and other destinations. By adding the two-way packet based communication capability, cable networks can now support both one-way communication of cable television broadcasts and two-way packet based data communication.

In order to allow a cable network to offer Internet access to cable subscribers in a bandwidth-efficient manner, the Cable Television Laboratories (CableLab) has developed a series of Data Over Cable System Interface Specification (DOCSIS) standards that govern the design of cable modems (CMs) residing in subscribers' premises and of cable modem termination systems (CMTSs) deployed and managed by the cable operator. The network that interconnects the CMs to a CMTS is called the cable access network or DOCSIS network, which may physically consist of coaxial cables and optical fibers, and other transmission equipment, such as lasers and amplifiers, in the cable plant, which is commonly referred to as Hybrid Fiber-Coax (HFC) network.

For a cable subscriber to communicate over the Internet, it uses a DOCSIS-compliant CM to interface with the DOCSIS network. As the gateway to the Internet, the CMTS controls the access of the CM to the bandwidth resources of the DOCSIS network. Although a coaxial cable has a usable RF spectrum in excess of 500 MHz, most of this spectrum is used for broadcasting TV programs. Accordingly, only a small portion is typically allocated to transport data via the DOCSIS network. Current versions of DOCSIS include DOCSIS 1.0, DOCSIS 1.1 and DOCSIS 2.0. Future releases of DOCSIS may continue to evolve to improve the two-way packet-based communication and may entail more RF bandwidth for such services.

One challenge in DOCSIS and similar protocols, such as the wireless counterpart to DOCSIS that enables two-way packet based communication over a shared RF access medium, is the control and management of downstream communication. As referenced herein, "downstream communication" generally refers to communication from a CMTS to a CM. In contrast, "upstream communication" generally refers to communication from a CM to a CMTS. A DOCSIS network may have several upstream channels and several downstream channels, each using a unique RF spectrum that does not conflict with other channels. The CMTS implements a scheduler to control each respective channel. In particular, the CMTS may implement an upstream scheduler to control each upstream channel and a downstream scheduler to control each downstream channel.

In scheduling downstream communication, a downstream scheduler generally receives and schedules large bursts of downstream network traffic. To effectively forward the large burst of downstream network traffic, a downstream scheduler may implement complicated queuing algorithms to ensure adequate delivery rates to the CMs during periods of network congestion. In contrast, in the case of upstream communications packets generated by subscribers' computers are queued at their respective CMs while waiting to be transmitted over the DOCSIS upstream channel. As such, unlike the downstream scheduler, an upstream scheduler leverages on the DOCSIS Medium Access Control (MAC) protocol to control the traffic flow from CMs to the CMTS. As a CM can make only one bandwidth request for a packet at a time, the upstream scheduler does not experience the same packet queuing problem of the downstream scheduler. Downstream packet scheduling is further complicated by the dominant transport layer protocol, i.e., TCP, used for end-to-end data transport between subscribers' computers and content servers in the Internet. Upstream communications, however, are regulated by the DOCSIS MAC protocol and generally subscribers generate much less upstream traffic. Specifically, DOCSIS requires a CM to request time slots from a CMTS in order to perform upstream transmissions. The CMTS can reject these time slot requests in order to regulate upstream communications, thereby eliminating large upstream network traffic bursts.

Downstream bandwidth contention may arise due to the large bursts of downstream network traffic and result in occasional downstream traffic congestion at the CMTS. Short-term downstream traffic congestion leads to queuing delays while sustained congestion causes buffer overflows and packet losses. Queuing delays and packet losses are two main contributors to the degradation of the Quality of Service (QoS) of a downstream traffic flow. QoS is sometimes used to refer to a level of service that a CMTS agrees to deliver to a subscriber's CM. For example, DOCSIS defines QoS by a set of requirements that include a maximum downstream traffic rate and a minimum downstream traffic rate. Other DOCSIS QoS requirements include a maximum downstream packet latency. The downstream scheduler controls the QoS associated with each active downstream service flow, i.e., each flow of downstream traffic intended for a particular CM. For example, the downstream scheduler is responsible for determining which packets receive precedence over other packets during periods of congestion. DOCSIS compliant CMTSs include a downstream scheduler that adheres to DOCSIS specifications regarding QoS requirements.

Advanced downstream schedulers that attempt to achieve fair bandwidth allocation between subscribers typically implement one of two queuing algorithms. Both of these queuing algorithms implement approximate solutions of a known high-precision fair queuing algorithm, Weighted Fair Queuing (WFQ). WFQ idealistically seeks to ensure fair treatment of downstream traffic flows during periods of congestion, but implementations of WFQ result in fairness compromises due to the substantial computations needed to correctly implement WFQ. The two approximate solutions, Weighted Round-Robin (WRR) and Deficit Round-Robin (DRR), were designed to alleviate some of the complexity of WFQ, i.e., reduce the amount of needed computations.

In reducing the complexity of WFQ, both WRR and DRR may disregard one or more of the important QoS attributes including possibly some requirements put forth by DOCSIS. The downstream scheduler implementing WFQ, WRR, DRR, or some variation thereof, may, in certain heavily loaded situations, allocate bandwidth to large traffic flows, such as a long File Transfer Protocol (FTP) session, while disregarding queuing latency of smaller traffic flows, such as short HyperText Transfer Protocol (HTTP) download sessions, for which queuing latency is critical. These algorithms may also violate the DOCSIS minimum downstream traffic rate during periods of heavy loading. By not paying special attention to the smaller flows, the downstream scheduler may possibly cause these flows to retransmit due to excessive queuing latency.

Downstream schedulers implementing WFQ, WRR, DRR, or some other variation thereof, may also fail to incorporate other DOCSIS requirements or require separate algorithms to meet these DOCSIS requirements. These downstream schedulers may, for example, reduce complexity by not implementing adequate rate limiting mechanisms, i.e., mechanisms that enforce maximum rate limits, appropriately allocating bandwidth during periods of congestion, or any combination thereof. In other cases, these downstream schedulers may become very complex and computationally costly to implement if these downstream schedulers implement separate algorithms to meet the DOCSIS requirements. Moreover, these queuing algorithms fail to account for the expanding nature of TCP sessions, i.e., the nature of TCP to expand a session to exploit available bandwidth, which is not a DOCSIS requirement, yet poses a threat to ensuring the DOCSIS QoS requirements.

In addition to violating DOCSIS requirements, a downstream scheduler implementing WFQ, WRR, DRR, or some variation thereof, may experience, during periods of congestion, issues associated with managing complexity as the number of active downstream service flows increases. As the number of active downstream service flows increases, the typical downstream scheduler increases complexity by adding another queue for each active downstream service flow in accordance with the algorithms described above. An increase in complexity generally results in decreased performance of the downstream scheduler and possibly causes violation of DOCSIS requirements. For example, the downstream scheduler may increasingly violate minimum downstream traffic rates as the number of active downstream service flows increase. In this manner, a downstream scheduler implementing one of the queuing algorithms discussed above may not fairly assign downstream bandwidth, adequately manage TCP sessions, violate agreed upon downstream QoS requirements, and fail to adhere to other DOCSIS requirements.

SUMMARY

In general, techniques are described for providing low complexity fair bandwidth allocation in a network device. More specifically, the techniques allow a downstream scheduler of a network device to fairly allocate bandwidth in accordance with user-configurable service classes. Moreover, the techniques prevent the network device from violating the DOCSIS standard while performing many of the operations pertinent to packet scheduling that a conventional packet scheduler cannot implement without added mechanisms.

In accordance with the techniques described herein, a downstream scheduler associated with a cable modem termination system (CMTS) includes a queuing module, a transmit queue and QoS policies. The queuing module includes a plurality of transitioning hold queues that the queuing module uses to account for service flow bursts, and more particularly, for buffering large TCP flows. For example, when the queuing module receives a packet identified as belonging to a service flow the queuing module determines in which of the plurality of hold queues to store the packet based on a service credit associated with the service flow. The service credit represents a bandwidth allocation available for consumption by the service flow. The queuing module transitions between the plurality of hold queues and assigns packets to ensure each service flow stays within the bounds of an associated service class. An operator of the CMTS may define a service class and store the service class to the downstream scheduler as QoS policies. A service class may define QoS attributes, such as a minimum rate and a maximum rate, as requirements that the queuing module may have to maintain.

The queuing module also cycles a queue state associated with each of the plurality of hold queues in order to achieve compliance with the QoS policies. The queue state represents a priority level for the respective hold queue. The queuing module may at determined time epochs transition each of the plurality of hold queues by promoting each of the plurality of hold queues by one or more priority levels, i.e., decrement the queue state associated with the hold queue. Also at each determined time epoch, the queuing module transfers packets from one of the plurality of hold queues having the highest associated priority level to the transmit queue ready for transmission over a downstream channel.

In one embodiment, a method comprises storing a packet to one of a plurality of hold queues, monitoring a loading condition of a transmit queue, and generating a time epoch based on the loading condition. The method further comprises transferring the packet from the one of the plurality of hold queues to a transmit queue for delivery to a network device via a downstream channel in response to the time epoch.

In another embodiment, a computer-readable medium comprises instructions. The instructions cause a programmable processor to store a packet to one of a plurality of hold queues, monitor a loading condition of a transmit queue, and generate a time epoch based on the loading condition. The instructions further cause the programmable processor to transfer the packet from the one of the plurality of hold queues to a transmit queue for delivery to a network device via a downstream channel in response to the time epoch.

In another embodiment, a device comprises a control unit that stores packets from a variable number of service flows to one of a static number of hold queues, monitors a loading condition of a transmit queue, and generates a time epoch based on the loading condition. The control unit further transfers the packet from the one of the static number of hold queues to a transmit queue for delivery to a network device via a downstream channel in response to the time epoch.

In another embodiment, a system comprises a cable modem and a cable modem termination system (CMTS). The CMTS comprises a downstream scheduler that includes a transmit queue, a load monitor, and a queue assignment module. The load monitor monitors a loading condition of the transmit queue and generates a time epoch based on the loading condition. The queue assignment module stores a packet to one of a plurality of hold queues, and transfers the packet from the one of the plurality of hold queues to the transmit queue for delivery to the cable modem via a downstream channel in response to the time epoch.

The techniques may provide one or more advantages. For example, the downstream scheduler implicitly implements rate limiting by assigning packets to the plurality of hold queues in accordance with the QoS policies. Rate limiting is ensured since the downstream scheduler only assigns packets to the plurality of hold queues having priority levels that allow transmission within the QoS attributes specified in the QoS policies. The downstream scheduler does not implement a separate mechanism to perform rate limiting and thus, the downstream scheduler maintains implicit rate limiting without added complexity.

The downstream scheduler further manages the expanding nature of large TCP flows by slowly expanding the rate window associated with the TCP flows. In other words, the plurality of hold queues temper the expanding nature of large TCP flows and allow these large TCP flows to adjust, rather than to timeout or otherwise fail. Moreover, in some embodiments, the number of hold queues is static, which reduces the complexity of the downstream scheduler. The service credit allows the downstream scheduler to maintain the number of hold queues independent of the number of service flows. The service credit in conjunction with rotating the priority levels of the plurality of hold queues allows the downstream scheduler to not only provide a static number of hold queues but to also update all of the service flows in a quick and efficient manner.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
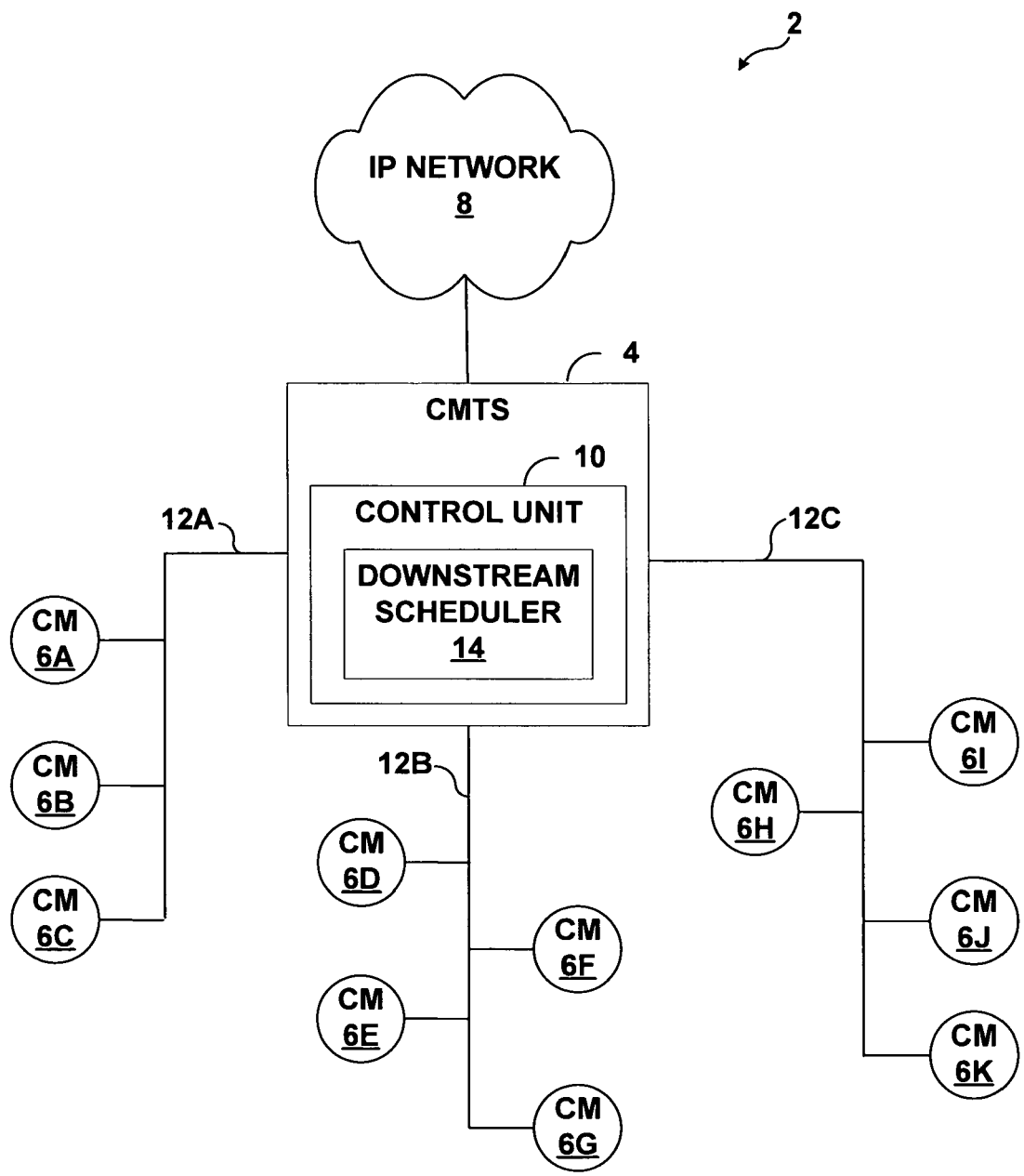
FIG. 1 is a block diagram illustrating an exemplary cable network that automatically allocates network resources subject to customer agreements in accordance with the principles of the invention.

FIG. 1 is a block diagram illustrating an exemplary cable network 2 that automatically allocates network resources in accordance with the principles of the invention. As shown in FIG. 1, cable network 2 includes a Cable Modem Termination System (CMTS) 4 that provides a computer interface between one or more routers or other devices (not shown) within a Internet Packet (IP) network 8 and Cable Modems (CMs) 6A-6K (collectively, "CMs 6"). CMTS 4 directs communication between other computers (not shown) attached to IP network 8 and CMs 6. IP network 8 may comprise a global network such as the Internet, which includes the IP network of the cable operator or a public or private IP packet network such as a corporate Wide Area Network (WAN).

CMTS 4 includes a control unit 10 that directs communications originating from CMs 6 to IP network 8 via an upstream channel of a respective one of coaxial cables 12A-12C (collectively, "coaxial cables 12"). Communications from CMs 6 to CMTS 4 are generally referred to herein as "upstream communications," and are typically assigned a particular frequency band unused by cable TV signals. Control unit 10 may include an upstream scheduler (not shown) to control access to the upstream channel. In cable network 2, upstream channels are generally not subject to traffic queuing issues because an upstream scheduler (not shown) of CMTS 4 can regulate upstream communication by granting and dismissing upstream bandwidth requests based on DOCSIS MAC protocol.

In contrast to upstream communications, downstream communications are subject to traffic burst issues that may compromise the Quality of Service (QoS) delivered to CMs 6. In general, the phrase "downstream communication" is used herein to refer to communication from CMTS 4 to one or more of CMs 6. In accordance with the principles of the invention, techniques can be implemented to improve downstream communication in cable network 2. Generally, downstream communication is assigned a frequency band that is different from that assigned to upstream communications and different from cable TV signals. The frequency band assigned to a downstream communication may be partitioned into many downstream channels. A downstream channel is assigned to a set of one or more of CMs 6, and each of CMs 6 may have access to more than one downstream channel. Control unit 10 supports a downstream scheduler 14 to prioritize and control each of the downstream channels.

In a DOCSIS compliant network, such as cable network 2, downstream scheduler 14 coordinates delivery of downstream traffic while striving to adhere to DOCSIS requirements. Cable network 2 may comply with other protocols, such as wireless variations of DOCSIS. For ease of illustration, however, cable network 2 is described in the context of the DOCSIS standard. DOCSIS Quality of Service (QoS) requirements specify that CMTS 4 and, more particularly, downstream scheduler 14 maintain downstream traffic rate minimums and downstream traffic rate maximums for each of a set of user-configurable service classes. Each service class typically defines varying levels of QoS requirements. For instance, a first service class may specify a 256 Kbps maximum downstream traffic rate, while a service subscriber class may specify a 512 Kbps maximum downstream traffic rate. Other DOCSIS requirements may include specifications regarding rate limiting. With respect to conventional implementations of downstream schedulers that attempt to provide fair bandwidth allocation, downstream scheduler 14 implements a low complexity algorithm for queuing packets yet fairly allocates bandwidth in accordance with the user-configurable service classes.

As described herein, downstream scheduler 14 dynamically and fairly allocates bandwidth to active service flows based in part on flow status information associated with each active service flow. An active service flow refers to a single traffic flow that actively transmits downstream traffic to one of CMs 6. Downstream scheduler 14 receives a packet from upstream, e.g., IP network 8, and determines an active service flow based on the packet, and more particular, packet header information associated with the packet. In the event an active service flow cannot be determined, downstream scheduler 14 determines whether to admit a new active service flow. In admitting a new active service flow, downstream scheduler 14 assigns and associates flow status information to the new active service flow. In some embodiments, CMs 6 may issue connection request signals and connection termination signals to downstream scheduler 14 to request connection via an active service flow and termination of an existing active service flow, respectively. In these embodiments, downstream scheduler 14 may filter packets that cannot be assigned to an active service flow.

Upon determining the active service flow, downstream scheduler 14 accesses flow status information associated with the determined active service flow. Next, downstream scheduler 14 assigns the packet to one of a number of holding queues based on the flow status information. The queues may be configured by the system or a user. Downstream scheduler 14 cycles the priorities of the holding queues at a determined time epoch, i.e., a determined point in time. Time epochs are dynamically determined based on the load of the downstream channel associated with downstream scheduler 14 within CMTS 4, which is determined based on the amount of packet data in a transmit queue within control unit 10. At every time epoch, downstream scheduler 14 transfers the contents of one of the holding queues into the transmit queue for transmission down the downstream channel. The chosen hold queue is one that possesses the highest current priority among all the hold queues. The downstream scheduler then re-prioritizes the holding queues in a cyclic manner.

In this manner, downstream scheduler 14 efficiently and automatically allocates downstream bandwidth while maintaining fair bandwidth allocation in accordance with DOCSIS requirements and/or certain advertised QoS policies. Moreover, downstream scheduler 14 provides for other DOCSIS requirements, such as rate limiting, as discussed in more detail below, without incurring substantial gains in complexity.

Figure 2:
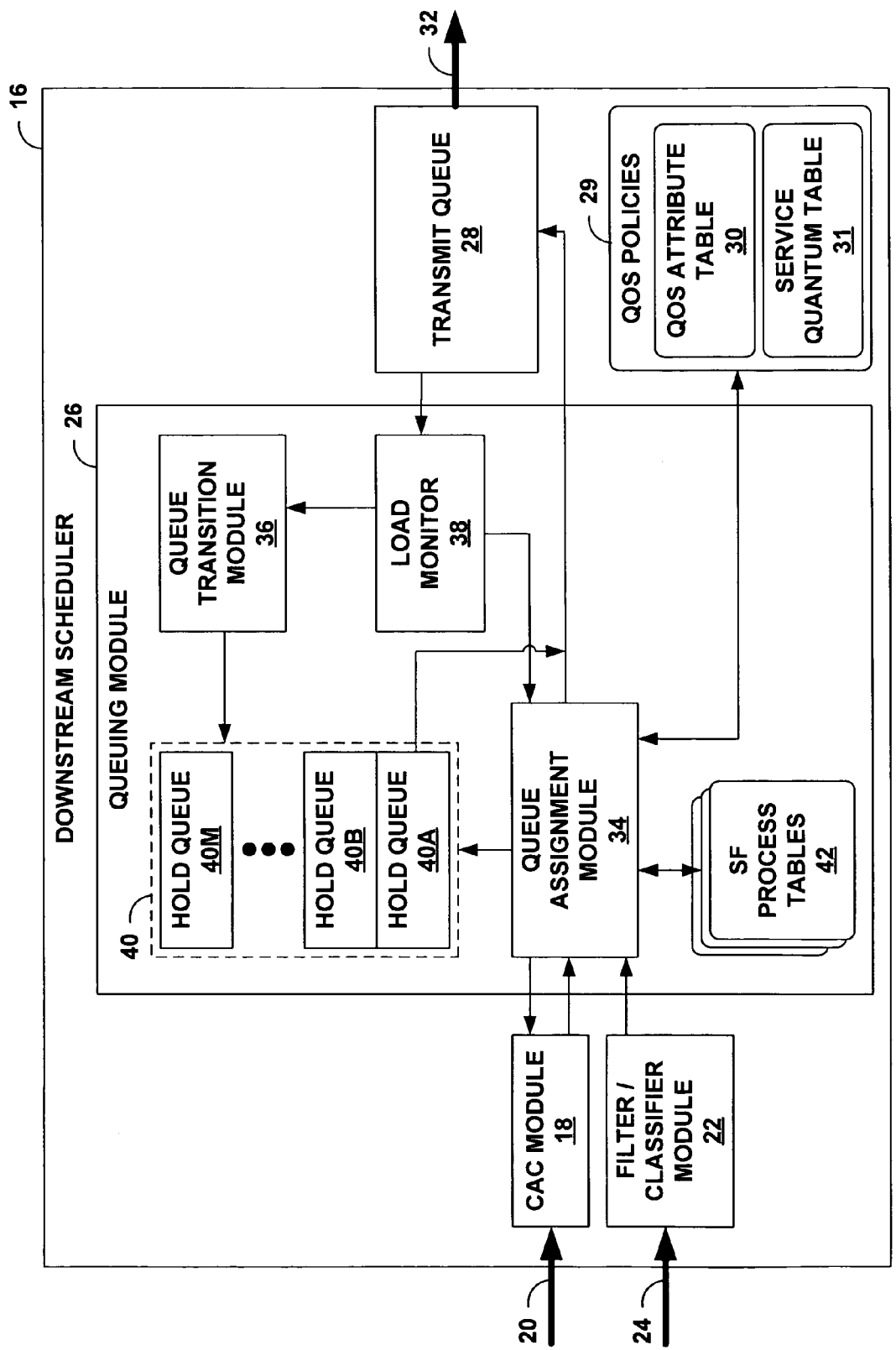
FIG. 2 is a block diagram illustrating an exemplary embodiment of a downstream scheduler that automatically allocates downstream bandwidth in accordance with the principles of the invention.

FIG. 2 is a block diagram illustrating an exemplary embodiment of a downstream scheduler 16 that automatically allocates downstream bandwidth in accordance with the principles of the invention. In the exemplary embodiment of FIG. 2, downstream scheduler 16 comprises a Connection Admission Control (CAC) module 18 that receives connection request and connection disconnect signals via connection signals 20. CMs, such as CMs 6 of FIG. 1, issue connection request signals 20 to CAC module 18 to establish active connections, i.e., active service flows.

Downstream scheduler 16 may also include a filter/classifier module 22 that receives packets destined for downstream CMs via arriving packet signal 24. Filter/classifier module 22 analyzes header information associated with each arriving packet to determine whether to filter the packet. In the event the header information identifies the packet as belonging to an active service flow, filter/classifier module 22 classifies the packet by assigning the packet a service flow identification (ID) number associated with the active service flow. In the event the header information identifies the packet as belonging to an unknown or unauthorized service flow, filter/classifier module 22 may drop the packet.

In addition, downstream scheduler 16 may include a queuing module 26, a transmit queue 28 and Quality of Service (QoS) policies 29. In general, queuing module 26 assigns classified packets to transmit queue 28 in accordance with QoS policies 29. Transmit queue 28 buffers the classified packets prior to broadcasting the packets over downstream channel 32. QoS policies 29 may include variables, such as variables to define QoS class definitions, operating parameters, and/or packet dropping policies. QoS policies 29 include a QoS attribute table 30 or other data structure that stores QoS attributes. QoS attributes may include, for example, a Maximum Sustained Traffic Rate (MSTR), a maximum transmission rate (i.e., rate limit), a minimum transmission rate, and a maximum burst size. An operator may configure QoS attribute table 30 via a user interface (not shown) or some other input mechanism to establish different service classes. Based on these user-configurable QoS attributes, downstream scheduler 16 may pre-compute, i.e., computer prior to servicing CMs 6, a service quantum table 31. Service quantum table 31 contains "service quantum" for each service class, and may further contain one or more service quanta for each service class, where each service quantum is selected based on a determined system load. In general, a "service quantum" may be viewed as a pre-computed quantum used by queuing module 26 for allocating and adjusting bandwidth based on current load conditions.

In the illustrated example of FIG. 2, queuing module 26 includes a queue assignment module 34, a queue transition module 36 and a load monitor 38 to facilitate assigning classified packets to transmit queue 28. Moreover, queue assignment module 26, as shown in FIG. 2, includes a user-configurable number of hold queues 40A-40M (collectively, "hold queues 40") and one or more Service Flow (SF) process tables 42. Upon receiving a classified packet from filter/classifier module 22, queue assignment module 34 accesses one of SF process tables 42 based on the service flow ID associated with the classified packet to obtain flow status information associated with the service flow ID. Queue assignment module 34 assigns the classified packet to one of hold queues 40 based on the flow status information.

Hold queues 40 may generally be used to accommodate flow bursts and to allow needy service flows to obtain bandwidth above their minimum rates without preventing other service flows from maintaining their associated minimum rates. In particular, hold queues 40 strive to temper the expanding nature of large TCP flows, i.e., the nature of TCP to expand a session to exploit available bandwidth, and allow these large TCP flows to adjust, rather than to timeout or otherwise fail. In this manner, downstream scheduler 16 prevents or reduces the number of TCP timeouts, which lead to packet retransmission, thereby alleviating congestion. The number of hold queues 40 may be a user-configurable variable, and thus the tempering of large TCP flows may be adjusted to suit a particular implementation of downstream scheduler 16. Moreover, the number of hold queues 40 does not need to directly correlate to the number of active service flows and, consequently, the number of hold queues 40 does not increase as the number of active service flows increases.

Since downstream scheduler 16 does not need to manage the addition and removal of individual hold queues to and from hold queues 40, the complexity of downstream scheduler 16 is reduced relative to conventional downstream schedulers that attempts to deliver fair bandwidth allocation.

Queue transition module 36 transitions each of hold queues 40, with the exception of the one currently possessing the highest priority, to a higher priority "state" once every time epoch. In general, the term "state" with respect to hold queues 40 refers to a current respective priority level associated with each of the hold queues. For example, queue transition module 36 may assign each of hold queues 40 a respective priority level ranging from 1 to M, where 1 represents the highest state (priority level) and M represents the lowest state. Once one of hold queues 40 reaches the highest state, e.g., queue state 1, queue assignment module 34 moves the classified packets stored in that hold queue to transmit queue 28. Queue assignment module 34 may, in some instances, also directly assign packets to transmit queue 28. For example, queue assignment module 34 may assign initial packets associated with a service flow to transmit queue 34 to facilitate quick service to small service flows. Load monitor 38 determines a time epoch by monitoring the number of packets residing in transmit queue 28. Generally, as the number of packets in transmit queue 28 decreases, load monitor 38 is more likely to trigger a time epoch. Conversely, as the number of packets increases, load monitor 38 is less likely to trigger a time epoch. In this manner, downstream scheduler 16 is load adaptive.

As described herein, queue assignment module 34 receives a classified packet from filter/classifier module 22, analyzes a service flow ID associated with the classified packet, and accesses one of SF process tables 42 based on the service flow ID. SF process tables 42 store flow status information for the active service flows. Flow status information may, for example, comprise a service class, a target queue state, a service credit and a priority. In some embodiments, the service class may serve as an index into QoS attribute table 30. Queue assignment module 34 uses the "target queue state" to select one of hold queues 40 in which an arriving packet of the active service flow is to be placed based on the current states of the hold queues. In this manner, the target queue state represents a current priority level associated with the service flow. The "service credit" represents a bandwidth allocation (credit) available for consumption by the service flow, and is used to determine whether or not an arriving packet of the active service flow can be stored in the identified one of holding queues 40, as described in more detail below. The priority is optional flow status information, and may give precedence to packets of active service flows having higher priority.

In this manner, queue assignment module 34 may utilize the service flow information, and more particularly, the service class, target queue state and service credit to determine which of hold queues 40 buffer the classified packet. For example, queue assignment module 34 may select hold queue 40B based on its currently assigned queue state and the target queue state of the service flow information. Next, queue assignment module 34 determines whether the service credit exceeds the size of the classified packet. In the event the service credit exceeds the size of the classified packet, queue assignment module 34 stores the classified packet to hold queue 40B. In the event the size of the packet exceeds the service credit, queue assignment module 34 demotes the target queue state by one level (e.g., decrements the target queue state) and selects the associated one of hold queues 40 (e.g., hold queue 40C), and increments the service credit associated with the service flow by a service quantum stored in service quantum table 31. In other words, queue assignment module 34 looks to the next highest one of hold queue 40 and gives the service flow additional bandwidth allocation for consumption. The service quantum stored in service quantum table 31 may be referenced using the service class and the determined system load as indexes into service quantum table 31. Queue assignment module 34 repeats this process until the packet is either assigned to one of hold queues 40 or dropped.

Queue assignment module 34 may also establish new service flows as well as terminate active service flows that have become inactive. CAC module 18 may receive congestion status information from queue assignment module 34 and may grant or deny connection requests based on the status information. CAC module 18 forwards flow status information pertinent to accepted service flows to queue assignment module 34, which in turn stores the flow status information to SF process tables 42. CAC module 18 may similarly treat a terminated flow by removing flow status information associated with the service flow that is terminated due to sustained inactivity.

As queue assignment module 34 manages arriving packets and SF process tables 42, load monitor 38 monitors transmit queue 28 to determine when to trigger a time epoch. As packets are loaded into transmit queue 28, downstream scheduler 16 continues to transmit the loaded packets via downstream channels 32. To ensure the agreed upon QoS requirements and DOCSIS compliance, especially during periods of congestion, load monitor 38 monitors the packet load of transmit queue 28 to ensure a proper load balance between packet loading and packet transmission. If packet loading into transmit queue 28 exceeds packet transmission, load monitor 38 may wait to trigger a time epoch and thus slow packet loading. If packet loading does not exceed packet transmission, load monitor 28 may trigger a time epoch to spur packet loading.

Load monitor 38 triggers a time epoch and issues the time epoch to queue transition module 36 and queue assignment module 34. In response, queue transition module 36 adjusts the queue states of hold queues 40. In particular, queue transition module 36 raises the queue state of each of hold queues 40, e.g., be decrementing the respective queue states. In other words, queue transition module 36 decrements the queue state of hold queue 40B, for example, to assume the queue state of hold queue 40A, and updates the queue state of hold queue 40A to assume the queue state of hold queue 40M. In this manner, queue transition module 36 can quickly and efficiently manage the priorities associated with hold queues 40. This process can be accomplished by referencing hold queues 40 with pointers and reassigning the pointers to reflect their current queue states. For example, queue transition module 36 can quickly update the pointer associated with hold queue 40A to point to hold queue 40M.

Queue assignment module 34 receives the time epoch and updates the target queue state of each active service flow in a similar manner, i.e., by updating the active service flow assigned to the highest target queue state to the lowest target queue state and promoting the target queue states associated with the other active service flows. In addition, queue assignment module 34 updates the service credit of each active service flow by adding the respective service quantum.

The process described above implicitly regulates bandwidth allocation to the active service flows based on the flow status information. Basically, queue assignment module 34 first allocates bandwidth to the active service flows, i.e., assigns packets associated with the active service flows to hold queues 40, to ensure the minimum rate stored in QoS attribute table 30 is maintained. After this initial bandwidth allocation, queue assignment module 34 allocates any remaining bandwidth to service flows having a higher service class, i.e., service flows with higher maximum rates and/or higher priorities. Also, higher service classes may have larger service quanta, which translate into a higher probability of being accepted into a higher-priority queue state. In this manner, customers who agree to pay more for a higher service class receive a higher class of service, i.e., more bandwidth, and moreover, downstream scheduler 16 ensures fair queuing based on agreed upon QoS requirements.

Figure 3:
FIG. 3 illustrates an exemplary entry of a QoS attributes table that stores QoS attributes in accordance with the principles of the invention.

FIG. 3 illustrates an exemplary entry 44 of QoS attribute table 30 (FIG. 2) that stores QoS attributes 48A-48D in accordance with the principles of the invention. Entry 44 includes a service class 46, and QoS attributes 48A-48D, such as a Maximum Sustained Traffic Rate (MSTR) 48A, a maximum rate 48B, a minimum rate 48C and a burst size 48D. Entry 44 may be user defined and include other user-defined QoS attributes other than or in addition to those shown in FIG. 3. While shown in FIG. 3 to conform to a table or array data structure, entry 44 may conform to any other data structure, such as a linked list.

Service class 46 associates entry 44 with one of a set of agreed upon levels of QoS. Service class 46 generally acts as an index for QoS attribute table 30 and aids queuing module 26 in quickly accessing defined attribute values associated with a particular level of QoS. MSTR 48A is a constant number that aids queuing module 26 in performing rate limiting on active service flows. In effect, MSTR 48A sets the upper bound for transmission rate that active service flows should not exceed, and typically is a DOCSIS-specified QoS requirement. Maximum rate 48B is another constant number queuing module 26 utilizes in ensuring fair bandwidth allocation. Minimum rate 48C, e.g., DOCSIS minimum reserved traffic rate, is yet another constant number queuing module 26 utilizes in guaranteeing each active service flow a defined minimum transmission rate. Finally, burst size 48D, e.g., DOCSIS maximum burst size, is another constant that queuing module 26 also uses to allow a new active service flows to transmit an initial burst of data regardless of an associated rate limit.

Figure 4:
FIG. 4 illustrates an exemplary entry of a service quantum table that stores service quantum for system load ranges in accordance with the principles of the invention.

FIG. 4 illustrates an exemplary entry 50 of service quantum table 31 (FIG. 2) that stores service quanta for system load ranges in accordance with the principles of the invention. In this example, entry 50 includes a service class 52 that generally acts as an index for service quantum table 31, and includes service quantum 54A-54D (collectively, "service quanta 54"). Each of service quanta 54 may associate with a system load range and a system load range may be encoded with a system load range number. The system load range number also generally acts as an index for service quantum table 31 to aid selection of a particular one of service quanta 54. For example, a system load range identified by system load range number 1 may define a load range specifying 0.025 seconds to 0.050 seconds and any determined system load in this range may share the same index and thus the same value for service quantum 54A. Each entry, such as entry 50, of service quantum table 31 may be pre-computed as described above, such that service quantum table 31 adds little or no additional complexity to downstream scheduler 16.

While shown in FIG. 4 to conform to a table data structure, entry 50 may conform to any other data structure, such as a linked list.

Figure 5:
FIG. 5 illustrates an exemplary entry of a service flow (SF) process table that stores flow status information in accordance with the principles of the invention.

FIG. 5 illustrates an exemplary entry 58 within SF process tables 42 (FIG. 2) that stores flow status information in accordance with the principles of the invention. Queuing module 26 maintains an entry similar to entry 58 for each active service flow. Entry 58 includes flow status information, such as a service flow identifier (ID) 60, a service class 62, a target queue state 64, a service credit 66 and a priority 68. While shown in FIG. 5 to conform to a table data structure, entry 58 may conform to any other data structure, such as a linked list.

Service flow ID 60 identifies a service flow and aids queuing module 26 in associating arriving packets with a particular active service flow. Each arriving packet is classified, i.e., assigned a service flow ID, by filter/classifier module 22, and queue assignment module 34 of queuing module 26 uses this assigned service flow ID as an index into SF process tables 42. Service class 62 is a constant number that indexes into QoS attribute table 30 or service quantum table 31 to retrieve an entry, such as entry 44 or entry 50, respectively. Target queue state 64 is a variable number that aids queue assignment module 34 in selecting one of hold queues 40. In one embodiment, target queue state identifies the last one of hold queues 40 to which queue assignment module 34 assigned a packet from the active service flow associated with entry 58. Queue assignment module 34 updates target queue state 64 each time it assigns a packet of the active service flow associated with entry 58 to one of hold queues 40. Service credit 66 is another variable number that queue assignment module 34 updates upon assigning the packet to one of hold queues 40. In general, service credit 66 stores an available "service credit" for submitting a packet to one of hold queues 40 and defines a maximum number of bytes that may be utilized, i.e., consumed, with the assignment. Priority 68 is a constant number to give priority to packets of the active service flow associated with entry 58 and is an optional QoS attribute.

Figure 6:
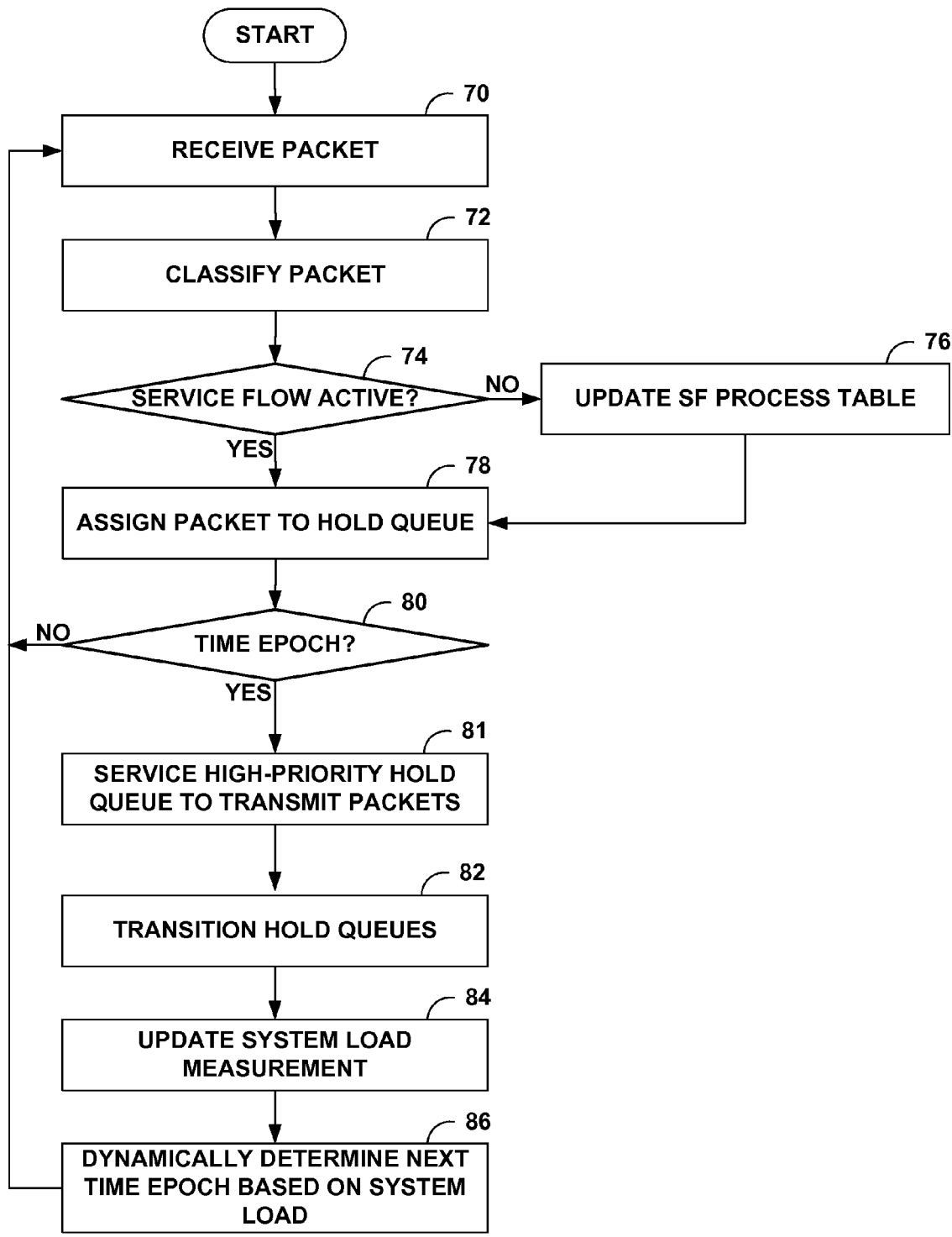
FIG. 6 is a flowchart illustrating exemplary operation of a downstream scheduler in accordance with the principles of the invention.

FIG. 6 is a flowchart illustrating exemplary operation of downstream scheduler 16 in accordance with the principles of the invention. Filter/classifier module 22 receives a packet via arriving packet signal 24 (70), and classifies the packet by assigning a service flow ID to the packet (72), as described above. Queue assignment module 34 receives the classified packet from filter/classifier module 22, and accesses SF process tables 42 to retrieve a corresponding entry for the service flow ID to determine whether the service flow is active (74).

In some embodiments, SF process tables 42 may contain temporarily inactive, or "zombie," service flows. Queue assignment module 34 assigns an identifier, such as "−1" to the target queue state included within entries of SF process tables 42 for these zombie service flows. If the service flow ID associated with the retrieved entry identifies a zombie service flow, queue assignment module 34 updates SF process table 42 (76) to return the service flow to an "on" state, i.e., sets the target queue state to a default, such as "0." Queue assignment module 34 may, after some amount of time or a defined number of time epochs, remove any zombie service flow from SF process tables 42.

If SF process tables 42 do not include the service flow ID associated with the received packet, queue assignment module 34 may update SF process table 42 by inserting, or reinserting in the case of removed zombie service flows, an entry with the appropriate service flow ID set into SF process tables 42. Queue assignment module 34 also sets the target queue state, such as target queue state 64 of FIG. 5, to a default (e.g., zero) and sets a service credit, such as service credit 66 of FIG. 5, to an initial service credit. Whether reactivating the service flow, inserting a newly activated service flow, or determining that the service flow is already active, queue assignment module 34 assigns the packet to one of hold queues 40 (78), and in some instances, as described above, queue assignment module 34 assigns the packet directly to transmit queue 28.

While queue assignment module 34 assigns packets to hold queues 40, load monitor 38 monitors transmit queue 28 to monitor the system load and generate time epochs. Both queue assignment module 34 and queue transition module 36 may receive a signal from load monitor 38 to indicate the triggering of a time epoch (80). In the event no time epoch signal is received, downstream scheduler 16 continues to receive packets, classify the packets and assign the packets to hold queues 40 (70, 72, 78).

However, in the event a time epoch occurs, queue assignment module 34 moves (e.g., by byte copying or pointer manipulation) all or a portion of the packets from the highest priority one of hold queues 40 to transmit queue 28 for transmissions via downstream channels 32 (81). In addition, queue transition module 36 "transitions" the queue states of hold queues 40, e.g., by demoting the hold queue with the highest queue state (e.g., a queue state of 1) to the lowest queue state (e.g., a queue state of M) and promoting the target queue states associated with the other hold queues (82).

While queue transition module 36 transitions hold queues 40, load monitor 38 reassesses the current system load (84) as measured by polling the amount of data in transmit queue 28. Load monitor 38 computes the next time epoch based on the updated system load (86). Downstream scheduler 16 continues to receive packets, classify the packets and assign the packets to hold queues 40 until the next time epoch occurs.

Figure 7:
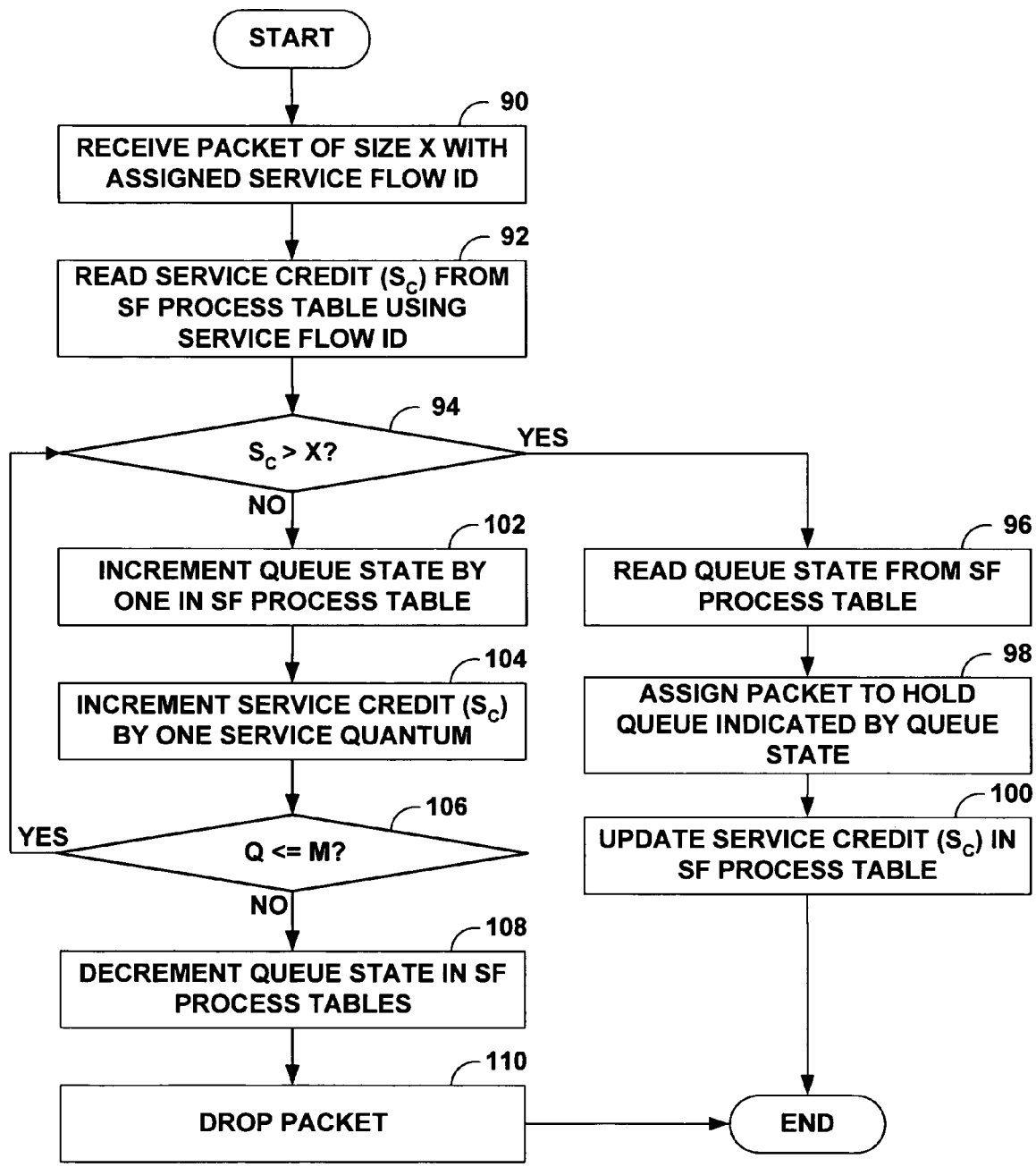
FIG. 7 is a flowchart illustrating exemplary operation of a queue assignment module in fairly allocating bandwidth in accordance with the principles of the invention.

FIG. 7 is a flowchart illustrating exemplary operation of a queue assignment module, such as queue assignment module 34 of FIG. 2, in fairly allocating bandwidth by assigning packets to hold queues, such as hold queues 40, in accordance with the principles of the invention. Initially, queue assignment module 34 receives a classified packet of size X with an assigned service flow ID from filter/classifier module 22 (90). In response, queue assignment module 34 accesses SF process tables 42 to determine a service credit associated with the active service flow ID (92). For example, queue assignment module 34 may use the service flow ID as an index into SF process tables 42 to access an entry, such as entry 58 (FIG. 5), and read the service credit, e.g., service credit 66, which is represented herein as variable $S_C$.

After accessing service credit $S_C$, queue assignment module 34 compares the service credit $S_C$ to the size of the received packet X (94). In the event service credit $S_C$ is greater than the packet size X, queue assignment module 34 reads the target queue state (herein referred to as variable Q), e.g., target queue state 64 of entry 58, from SF process tables 42 (96), assigns the packet to one of hold queues 40 in accordance with the target queue state Q (98), and updates the service credit $S_C$ of the respective entry within SF process tables 42 (100). Queue assignment module 34 updates the service credit $S_C$ by subtracting the packet size X from the service credit $S_C$ and writing the updated service credit back to SF process tables 42.

In the event service credit $S_C$ is not greater than the packet size X, however, queue assignment module 34 computes a new target queue state Q for the associated service flow by first incrementing the target queue state Q stored in SF process table 42 (102). Next, queue assignment module 34 accesses SF process tables 42, again using the service flow ID as an index, to access the service class, e.g., service class 62 of entry 58, which queue assignment module 34 uses to index into service quantum table 31 to determine the service quantum, e.g., one of service quanta 54A-54D of entry 50 (FIG. 4). Queue assignment module 34 also uses the last determined system load (herein represented by variable H) to also index into service quantum table 31 to determine a particular one of service quantum 52, as described above. Queue assignment module 34 adds the selected service quantum (herein represented by constant G) to the service credit $S_C$ (104), and determines whether the newly computed target queue state Q is less than or equal to the number of hold queues 40, which herein is represented as variable M (106).

In the event the newly computed target queue state Q is greater than the number of hold queues 40, or constant M, queue assignment module 34 decrements the target queue state Q stored in SF process tables 42 (i.e., promotes the priority level) for that service flow (108) and drops the packet (110). In the event that the newly computed queue state Q is less than or equal to the number of hold queues 40, however, queue assignment module 34 again compares the service credit $S_C$ to the packet size X, as described above. Queue assignment module 34 repeats the process of updating the queue state Q and the service credit $S_C$ until either service credit $S_C$ is greater than the packet size X or the packet is dropped.

In some embodiments, queue assignment module 34 may, due to physical limitations, first check whether a determined one of hold queue 40 has enough free space to hold the packet of size X. In the event a determined one of hold queues 40 does not have enough free space, even though the service credit $S_C$ may exceed the packet size X, queue assignment module 34 may perform operations as if service credit $S_C$ is less than the packet size X. While this limitation may slightly compromise fairness, physical limitations are unavoidable and this should not limit the scope of the invention.

Figure 8:
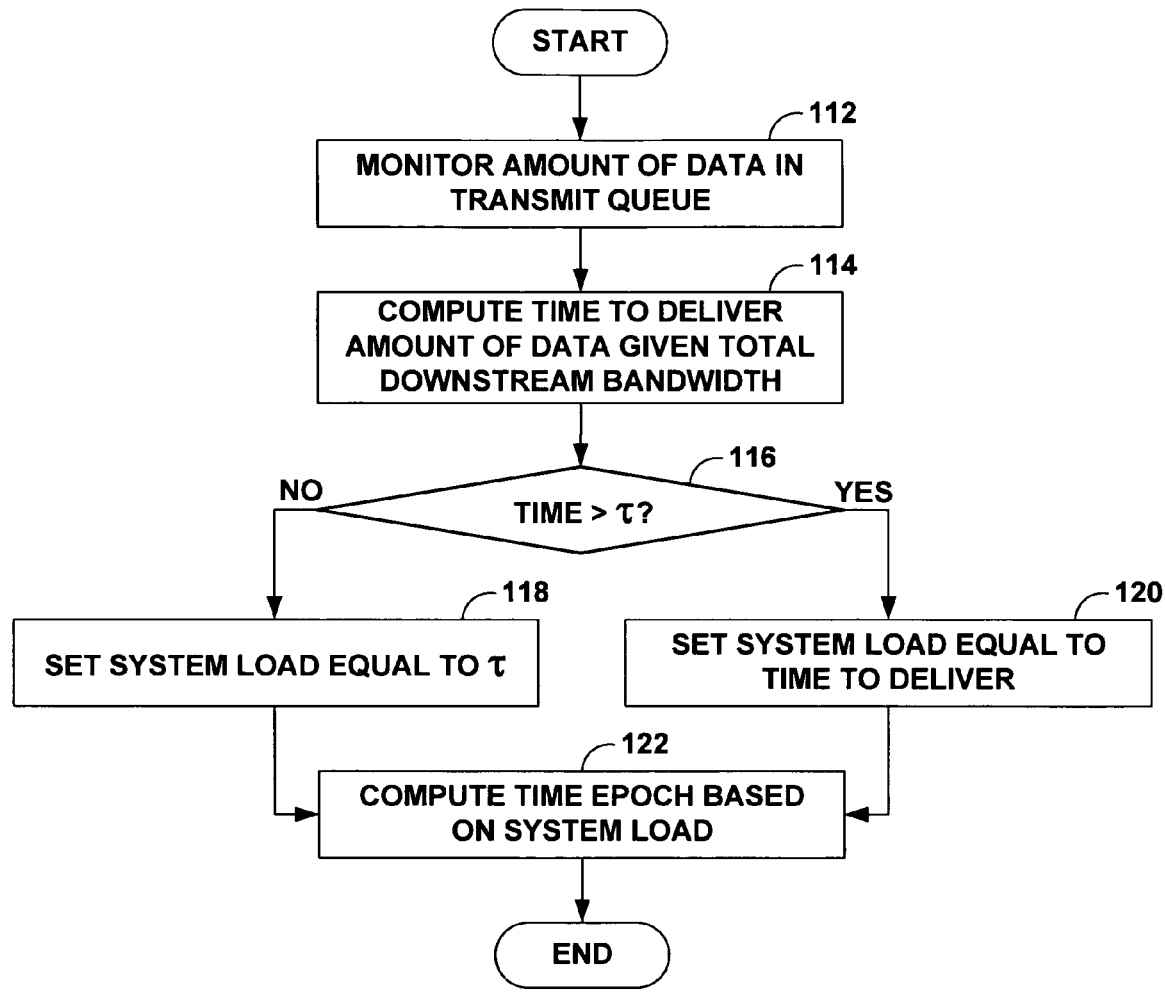
FIG. 8 is a flowchart illustrating exemplary operation of a load monitor in determining system load and triggering time epochs consistent with the principles of the invention.

FIG. 8 is a flowchart illustrating exemplary operation of a load monitor, such as load monitor 38 (FIG. 2), in determining current system load and triggering time epochs consistent with the principles of the invention. Load monitor 38 determines the system load, which herein is represented by function h(t), at a time t by first monitoring the amount of data, which herein is represented by function $q_0(t)$, in transmit queue 28 (112). Typically, load monitor 38 polls transmit queue 28 for $q_0$ at time t where t equals the time of a current time epoch, which is represented herein by $t_n$.

After receiving $q_0(t)$, load monitor 38 divides $q_0(t)$ by the total downstream bandwidth, which herein is represented by constant C, to compute a time to deliver $q_0(t)$ (114). Load monitor 38 compares the time to deliver $q_0(t)$ to a constant lower limit $\tau$ (116). In the event the time to deliver $q_0(t)$ is not greater than $\tau$, load monitor 38 sets the system load h(t) equal to $\tau$ (118). In the event the time to deliver $q_0(t)$ is greater than $\tau$, load monitor 38 sets the system load h(t) equal to the time to deliver $q_0(t)$, or $q_0(t)/C$ (120). Mathematically, load monitor 38 implements the following equation (1) to determine the system load h(t):

$$h(t) = \max(q_0(t)/C, \tau). \tag{1}$$

In either event, load monitor 38 computes a next time epoch $t_{n+1}$ based on the determined system load h(t) (122) as follows in equation (2):

$$t_{n+1} = t_n + h(t_n). \tag{2}$$

Time epoch $t_{n+1}$, therefore, is equal to the current time epoch value $t_n$ plus the system load as measured at the time of the current time epoch $h(t_n)$.

Based on equations (1) and (2) downstream scheduler 16 provides for DOCSIS-specified MSTR rate limiting. The constant lower limit $\tau$ is a lower limit imposed on h(t) to ensure downstream scheduler 16 achieves automatic MSTR rate limiting. Without the constant lower limit $\tau$, downstream scheduler 16 may allow active service flows to exceed the MSTR limit. In other words, if the system load h(t) was simply equal to $q_0/C$, instances may occur where $q_0/C$ is a very small number leading to time epochs that are triggered in close succession and thereby speeding delivery of packets of a given service flow in transmit queue 28 above the MSTR limit of the flow. However, the constant lower limit τ does not permit h(t) to decrease the interval between time epochs beyond a certain time interval. The constant lower limit τ may be user-defined to facilitate tailoring downstream scheduler 16 to meet specific user needs.

Figure 9:
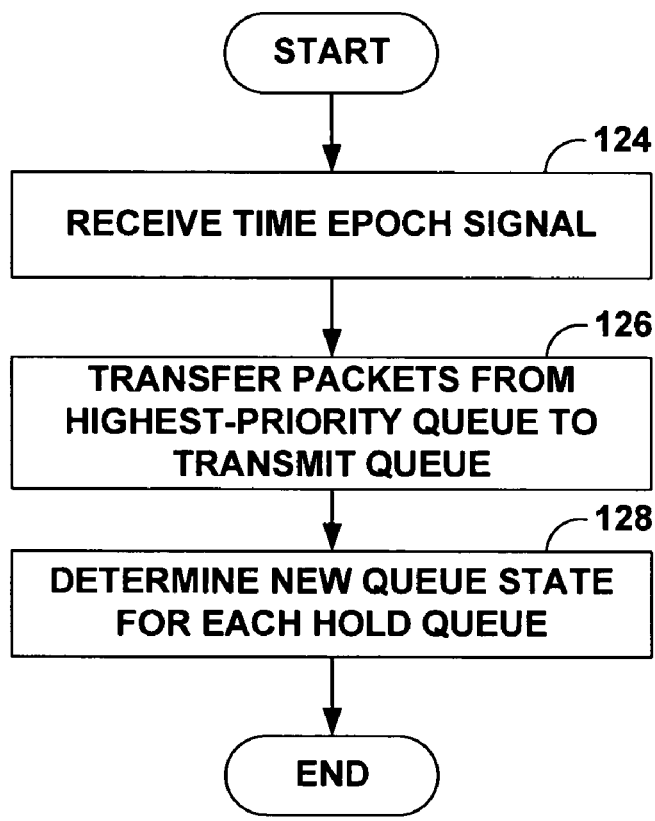
FIG. 9 is a flowchart illustrating exemplary operation of a queue transition module in transitioning hold queues in accordance with the principles of the invention.

FIG. 9 is a flowchart illustrating exemplary operation of a queue transition module, e.g., queue transition module 36 of FIG. 2, in transitioning hold queues, e.g., hold queues 40, in accordance with the principles of the invention. Initially, queue transition module 36 receives a time epoch signal from load monitor 38 (124). Queue transition module 36 transfers all or a portion of the packets from the one of hold queues 40 identified as having the highest priority current queue state Q to transmit queue 28 (126). As described above, queue transition module 36, in some embodiments, maintains pointers to identify which of hold queues 40 are associated with the queue states Q of one to M, i.e., the user-configurable number of hold queues 40.

Once all the packets are transferred, queue transition module 36 determines a new queue state for each of hold queues 40 (128), and in particular decrements the queue state associated with each of hold queues 40 by one except for the highest-priority hold queue, which is set to the lowest-priority level, M. Specifically, queue transition module 36 may act in accordance with the following equation (3) as follows:

$$Q_k \leftarrow Q^{(n+k) \bmod M} \text{ for all } 1 \leq k \leq M. \tag{3}$$

In equation (3), let $Q_k$ denote the M "logical" queues states where the index k indicates the "proximity" to transmit queue 28, i.e., the logical distance for each of the queues from the highest priority. Let $Q^{(n+k) \bmod M}$ denote the M physical hold queues 40 during the time interval $(t_n, t_{n+1})$ that may be designated buffer spaces or lists provisioned to physically house packets sent to hold queues 40. Finally, n refers to the time epoch number, such as time epoch $t_{n=1}$. Equation (3) defines a time-varying one-to-one mapping between the M logical queue states and the M physical hold queues. The $Q_k \rightarrow Q^j$ notation signifies that packets assigned to $Q_k$ are stored to $Q^j$.

In this manner, queue transition module 36 ensures fair queuing by granting an additional service quantum to each active service flow within every new rate window, i.e., within the time interval until the next time epoch. Granting the additional service quantum is achieved by lowering the queue state of each flow by one at every time epoch. As such, an active service flow having a packet arrival rate matching its bandwidth share will maintain a steady queue state.

Figure 10:
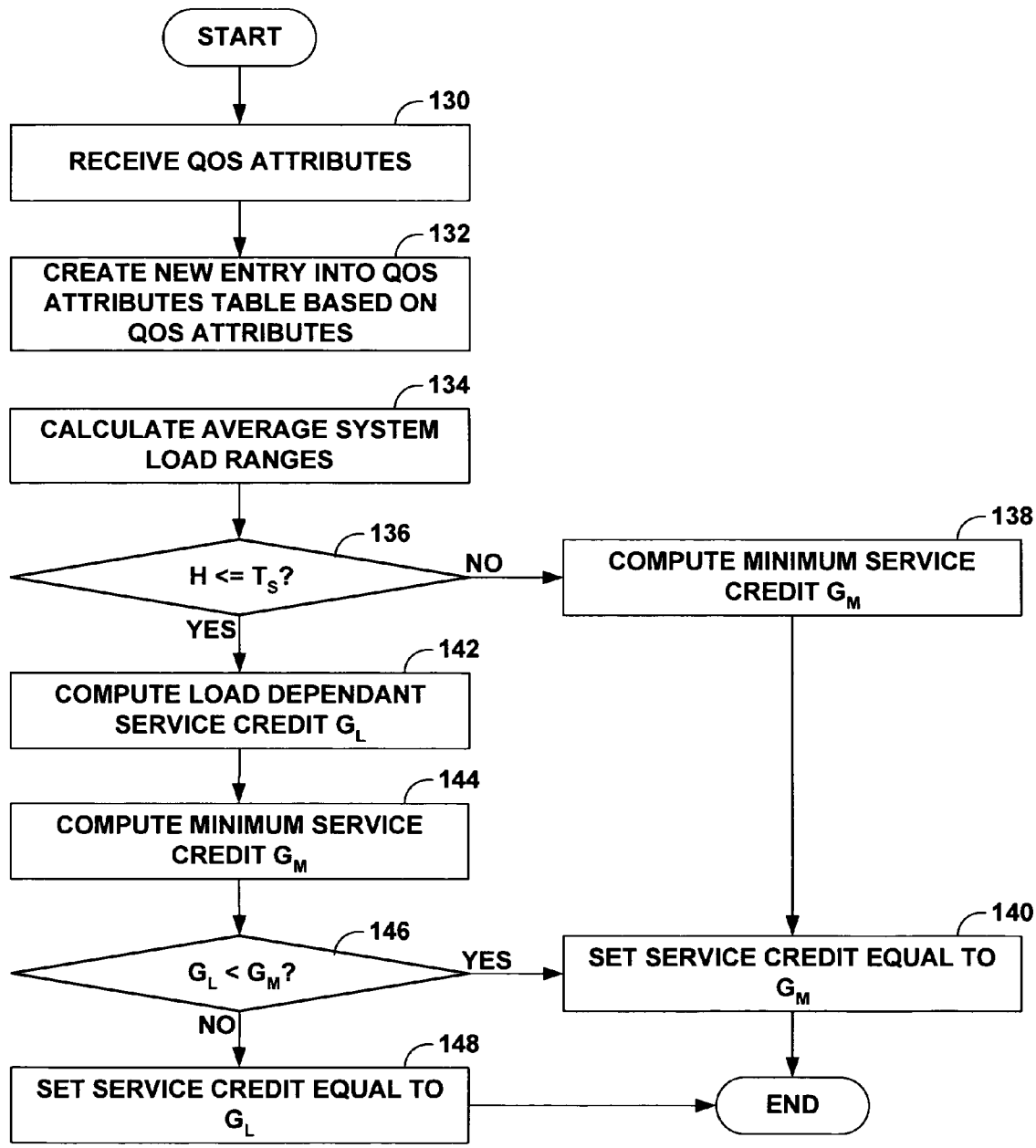
FIG. 10 is a flowchart illustrating exemplary operation of a downstream scheduler in calculating service quantum in accordance with the principles of the invention.

FIG. 10 is a flowchart illustrating exemplary operation of a downstream scheduler, such as downstream scheduler 16 of FIG. 2, in calculating service quanta in accordance with the principles of the invention. Initially, queue assignment module 34 receives QoS attributes, as described above, from an operator that define QoS policies, such as QoS policies 29 (130). In particular, the operator may create a new service class, and downstream scheduler 16 inserts a new entry, such as entry 44 (FIG. 3), into QoS attribute table 30 based on the received QoS attributes (132). Downstream scheduler 16 also determines average system load ranges (134) by assigning a lower limit equal to a multiple of a constant τ and an upper limit equal to a greater multiple of the constant τ. Downstream scheduler 16 may define an exemplary set of load ranges as follows:

Load Range 1: τ<=H<2τ,
Load Range 2: 2τ<=H<3τ, and
Load Range 3: $T_S$=3, <=H (Saturation).

For each system load range, downstream scheduler 16 calculates a service quantum. Downstream scheduler 16 calculates a service quantum for the load ranges 1 and 2 in a substantially similar manner, however when calculating load range 3, downstream scheduler 16 utilizes a different equation set as described below.

After determining the load ranges, queue assignment module 34 compares the median of each system load range to a latency limit $T_S$ (136). In the event the average system load H is not less than the latency limit $T_S$, e.g., as in load range 3, queue assignment module 34 computes a minimum service quantum, which herein is represented by $G_M$ (138). Since saturation occurs when the average system load H is greater than the latency limit $T_S$, the newly activated service flow receives a minimum bandwidth partition allowed by the specified service class. Queue assignment module 34 calculates the minimum service quantum $G_M$ during periods of saturation in accordance with the following equation (4):

$$G_M = r^* T_S \tag{4}$$

where r is the minimum rate, in bits per second (bps), associated with the service class. Downstream scheduler 16 accesses QoS attribute table 30 using the received service class as an index to obtain an entry, such as entry 44 of FIG. 3. From the entry, queue assignment module 34 extracts the minimum rate (herein represented by constant r), e.g., minimum rate 48C, and multiplies the minimum rate r by latency limit $T_S$ to compute $G_M$. Downstream scheduler 16 sets the service quantum G, e.g., one of service quantum 54A-54D of entry 50, in a service quantum table, e.g., service quantum table 31, equal to the minimum service quantum $G_M$ (140). In this instance, the entry may comprise three service quanta and downstream scheduler 16 may set the third service quantum to $G_M$, since the third service quantum corresponds the highest system load range, i.e., system load range 3.

In the event the median average system load H is less than or equal to the latency limit $T_S$, e.g., load range 1 and 2, queue assignment module 34 computes a load dependent service quantum $G_L$ (142) in accordance with the following equation (5):

$$G_L = R^* \tau^* f(H) \tag{5}$$

Downstream scheduler 16 accesses QoS attribute table 30 using the received service class as an index to obtain an entry, such as entry 44, and from the entry downstream scheduler 16 extracts the maximum rate (herein represented by constant R), e.g., maximum rate 48B. Downstream scheduler 16 also uses known constant τ and f(H), which is a monotone decreasing function of the average system load H. Constant τ may be user configurable so that a user may adjust downstream scheduler to particular user needs. Function f(H) acts as a "shaper" and serves to shrink the service quantum in the face of an increasing system load. In effect, shaper function f(H) allows downstream scheduler 16 to compress the bandwidth shares allocated to active service flows more effectively when the system load increases. In the instance where the active service flows are large TCP flows, shaper function f(H) is designed to counter the expanding nature of these TCP flows i.e., the nature of TCP to expand a session to exploit available bandwidth, thus reducing the possibility of timeouts and retransmissions, which reduces congestion. In conjunction with calculating load dependent service quantum $G_L$, downstream scheduler 16 also calculates minimum service quantum $G_M$ (144). Since average system load H does not exceed the latency limit $T_S$, i.e., no saturation, downstream scheduler 16 calculates minimum service quantum $G_M$ in accordance with the following equation (6):

$$G_M = r*H \qquad (6)$$

Downstream scheduler 16 again accesses QoS attribute table 30 to obtain the minimum rate r, only instead of multiplying the minimum rate r by latency limit $T_S$, downstream scheduler 16 multiplies the minimum rate r by the average system load H. Downstream scheduler 16 compares the load dependent service quantum $G_L$ to the minimum service quantum $G_M$ (146) to determine which is greater and set the service quantum G, e.g., one of service quantum 54A-54D as determined by the average system load H. Mathematically, downstream scheduler 16 implements the following equation (7):

$$G = \max(G_L, G_M) \qquad (7)$$

In the event the load dependant service quantum $G_L$ is greater, downstream scheduler 16 sets the service quantum of the entry in service quantum table 31 to the load dependant service quantum $G_L$ (148). In the event the minimum service quantum $G_M$ is greater, downstream scheduler 16 sets the service quantum of the entry in service quantum table 31 to the minimum service quantum $G_M$ (140).

In this manner, downstream scheduler 16 may pre-compute service quantum table 31 based on QoS attributes included within QoS attribute table 30. Thus, downstream scheduler 16 incurs little or no additional complexity during operation, i.e., while actively routing packets, which in turn may facilitate fair queuing.

The exemplary operations accorded to downstream scheduler 16 in determining service quanta may be performed by queue assignment algorithm 26 during active packet routing. In particular, queue assignment algorithm 26 may perform similar operations in the event a new service flow is activated. Queue assignment module 26 may determine an initial service quantum and assign the newly activated service flow a service credit $S_C$ in accordance with the following equation (8):

$$S_c = \max(B, R*T_S*f(H), r*H) \qquad (8)$$

In equation (8), the service quantum $S_c$ is assigned to the maximum value of a burst size B, a load dependent service quantum $G_L$ or a minimum service quantum $G_M$. Queue assignment module 34 determines the burst size B, e.g., burst size 48D, from an entry, such as entry 44, of QoS attribute table 30. Queue assignment module 34 determines load dependant service quantum $G_L$ in a similar manner as above, only instead of multiplying by average system load H, queue assignment module 34 multiplies by the latency limit $T_S$. Finally, queue assignment module 34 calculates the minimum service quantum $G_M$ as if downstream scheduler 16 was not experiencing saturation.

With a meaningful burst size B, queue assignment module 34 may provide the newly active service flow with a larger initial service credit that generally exceeds most service quanta stored in service quantum table 31 for the service class with which the newly activated service flow is associated. Thus, downstream scheduler 16 grants newly active service flows a higher class of service so that short service flows are quickly serviced. This protects queuing latency and may reduce congestion, since conventional downstream schedulers generally do not adequately address responsiveness to short service flows, causing short service flows to timeout and retransmit; and these retransmission only further add to the congestion.

Figure 11:
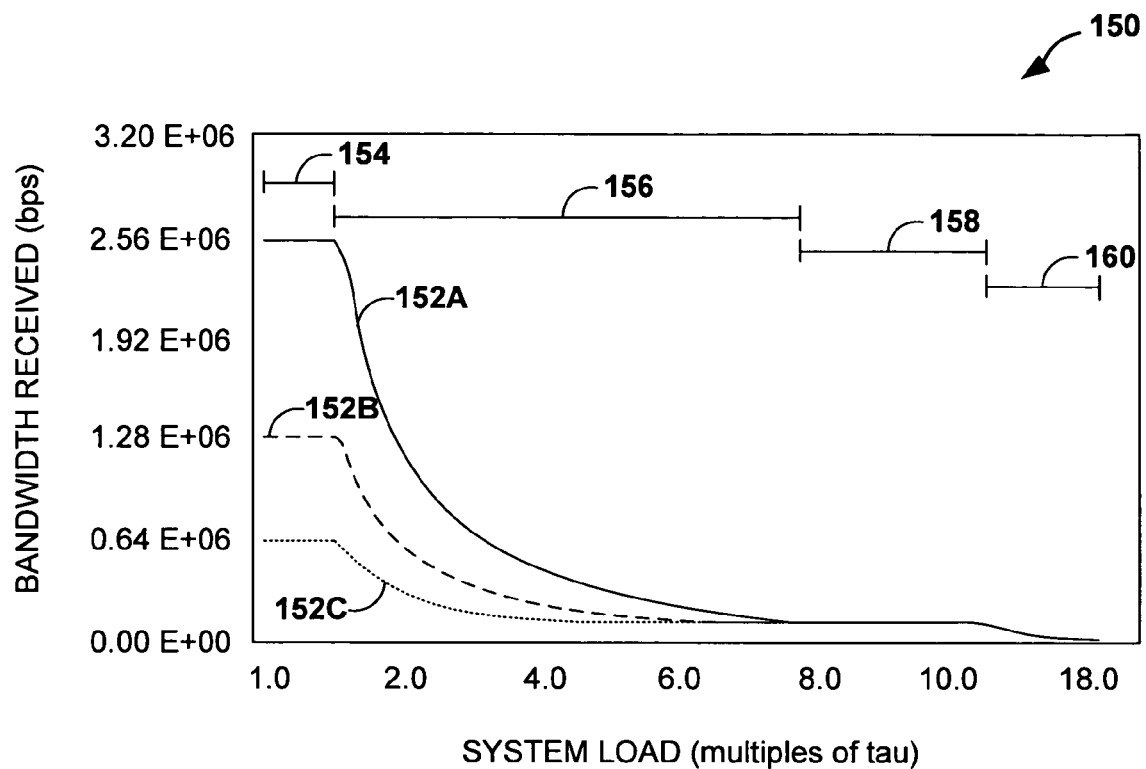
FIG. 11 illustrates a graph that depicts exemplary operation of a downstream scheduler operating in accordance with the principles of the invention.

FIG. 11 illustrates a graph 150 that depicts exemplary operation of downstream scheduler 16 in accordance with the principles of the invention. Graph 150 includes three non-linear plots 152A-152C that represent the amount of bandwidth service flows associated with three different service classes receive as system load increases. The bandwidth is shown in bits per second (bps) along the vertical axis of graph 150, and system load is shown in multiples of τ along the horizontal axis of graph 150.

As shown in FIG. 11, a service flow having a highest service class receives the most bandwidth, as shown by plot 152A. Line 152A, in particular, represents a service flow from a service class specifying a maximum rate to minimum rate ratio of 20. A service flow having a mid-level service class receives a respective mid-level of the bandwidth, as shown by plot 152B. Plot 152B, in particular, represents a service flow from a service class specifying a maximum rate to minimum rate ratio of 10. Finally, a service flow having a low service class receives a respective low amount of the bandwidth, as shown by plot 152C. Plot 152C, in particular, represents a service flow from a service class specifying a maximum to minimum rate ratio of five (5). In all computed ratios, the minimum rate remains constant and the maximum rate varies between service classes.

Initially, plots 152A-152C indicate their respective service flows achieve maximum rates in maximum rate zone 154. As the system load increases, each of the service flows associated with plots 152A-152C enter fair queuing zone 156 and indicate increasingly less amounts of the bandwidth for the service classes. In fair queuing zone 156, the service flows with a higher service class still receive a proportionally higher share of the bandwidth, as does the service flows with a mid-level service class. Once the system load increases beyond fair queuing zone 156, plots 152A-152C indicate their service flows enter minimum rate zone 158. In minimum rate zone 158, each service flow receives an associated minimum rate. As the system load continues to increase, plots 152A-152C enter RED zone 160, where packets associated with the service flows are dropped according to the conventional Random Early Detection (RED) algorithm.

While discussed in the context of a CMTS, the principles of the invention may be applied to other devices requiring queuing. In particular, network routers or other devices may adhere to the principles of the invention to more efficiently schedule delivery of traffic. In addition, although the techniques have been described as elements embodied within a single device, the described elements may be distributed to multiple devices. The term "system," is used herein to generally refer to embodiments of the invention in which the described elements are embodied within a single network device or distributed to multiple network devices. Various embodiments of the invention have been described. These and other embodiments are within the scope of the following claims.

The invention claimed is:

1. A method comprising:
   storing, with a network device, a packet to one of a plurality of hold queues;
   monitoring, with the network device, a loading condition of a transmit queue by monitoring an amount of data residing within the transmit queue;
   dynamically determining, with the network device, a time epoch based on the loading condition by (i) computing a transmission time to deliver the amount of data in the transmit queue, (ii) computing a system load in units of time by comparing the transmission time to a constant lower limit and selectively setting the system load based on the comparison, and (iii) computing the time epoch based on the system load and a previous time epoch, wherein selectively setting the system load comprises setting the system load equal to the transmission time when the transmission time exceeds the constant lower limit; and at the dynamically determined time epoch, transferring, with the network device, the packet from the one of the plurality of hold queues to the transmit queue for delivery to a network device via a downstream channel.

2. The method of claim 1, wherein selectively setting the system load comprises setting the system load equal to the constant lower limit when the constant lower limit exceeds the transmission time.

3. The method of claim 1, wherein computing the time epoch comprises adding the system load to the previous time epoch.

4. The method of claim 1, further comprising:
associating the packet with a service flow;
identifying a service credit associated with the service flow, wherein the service credit represents a bandwidth allocation available for consumption by the service flow; and
assigning the packet to one of the plurality of hold queues based on the identified service credit.

5. The method of claim 4, wherein assigning the packet comprises assigning an initial packet associated with the service flow to the transmit queue.

6. The method of claim 4, wherein assigning the packet comprises:
identifying a target queue state associated with the service flow, wherein the target queue state specifies a current priority level associated with the service flow; and
selecting the one of the plurality of hold queues based on the target queue state.

7. The method of claim 4, wherein assigning the packet comprises:
comparing the service credit to the size of the packet; and
selectively assigning the packet to the one of the plurality of hold queues based on the comparison.

8. The method of claim 7, wherein selectively assigning the packet comprises assigning the packet to the one of the plurality of hold queues when the service credit is greater than or equal to the size of the packet.

9. The method of claim 7, further comprising adjusting the service credit by subtracting the size of the packet from the service credit.

10. The method of claim 7, wherein selectively assigning the packet comprises:
comparing the service credit to the size of the packet; and
selecting a different one of the plurality of hold queues when the service credit is less than the size of the packet.

11. The method of claim 10, wherein selecting a different one of the plurality of hold queues comprises:
adjusting the service credit; and
selecting the different one of the hold queues based on the adjusted service credit.

12. The method of claim 11, wherein adjusting the service credit comprises:
defining a set of configurable service classes;
pre-computing service quanta for each service class in the set, wherein the service quantum represents a pre-computed bandwidth adjustment for different network loading conditions;
associating the packet with one of the service classes;
selecting one of the pre-computed service quanta based on the one of the service classes associated with the packet and a current network loading condition; and
adjusting the service credit based on the selected one of the pre-computed service quanta.

13. The method of claim 10, further comprising:
identifying a target queue state associated with the service flow, wherein the target queue state specifies a current priority level associated with the service flow;
adjusting the target queue state associated with the service flow to demote the target queue state by one or more priority levels; and
selecting the different one of the plurality of hold queues based on the adjusted target queue state.

14. The method of claim 13, wherein adjusting the target queue state comprises:
identifying a service class associated with the packet;
monitoring the loading condition of the transmit queue;
adjusting the service credit based on the determined service class and the monitored loading condition; and
selecting the different one of the plurality of hold queues based on the adjusted service credit and the adjusted target queue state.

15. The method of claim 14, wherein monitoring the loading condition comprises monitoring the amount of data residing within the transmit queue.

16. The method of claim 13, further comprising:
comparing the adjusted target queue state to a lowest priority level; and
dropping the packet when the adjusted target queue state is less than the lowest priority level.

17. The method of claim 1, further comprising transmitting the packet from the transmit queue to the network device via the downstream channel.

18. The method of claim 17, wherein transmitting the packet comprises assigning a queue state to each one of the plurality of hold queues, wherein the queue state represents a priority level for the respective hold queue.

19. The method of claim 18, further comprising reassigning the queue state assigned to each one of the plurality of hold queues in response to the time epoch.

20. The method of claim 19, wherein reassigning the queue state comprises:
demoting the queue state of the highest priority one of the plurality of hold queues to the queue state of the lowest priority one of the plurality of hold queues; and
promoting the queue states of the remaining hold queues by a priority level.

21. A computer-readable storage medium that stores instructions for causing a programmable processor to:
store a packet to one of a plurality of hold queues;
monitor a loading condition of a transmit queue by monitoring an amount of data residing within the transmit queue;
dynamically determine a time epoch based on the loading condition by (i) computing a transmission time to deliver the amount of data in the transmit queue, (ii) computing a system load in units of time by comparing the transmission time to a constant lower limit and selectively setting the system load based on the comparison, and (iii) computing the time epoch based on the system load and a previous time epoch, wherein selectively setting the system load comprises setting the system load equal to the transmission time when the transmission time exceeds the constant lower limit; and transfer, at the dynamically determined time epoch, the packet from the one of the plurality of hold queues to the transmit queue for delivery to a network device via a downstream channel.

22. The computer-readable storage medium of claim 21, further storing instructions to cause the processor to:

associate the packet with a service flow;

identify a service credit associated with the service flow, wherein the service credit represents a bandwidth allocation available for consumption by the service flow; and assign the packet to one of the plurality of hold queues based on the identified service credit.

23. The computer-readable storage medium of claim 22, further storing instructions to cause the processor to transmit the packet via the downstream channel to the network device.

24. A network device comprising a static number of hold queues;

a transmit queue; and a control unit that stores packets from a variable number of service flows to one of the static number of hold queues, monitors a loading condition of the transmit queue by monitoring an amount of data in the transmit queue, dynamically determines a time epoch based on the loading condition by (i) computing a transmission time to deliver the amount of data in the transmit queue, (ii) computing a system load in units of time by comparing the transmission time to a constant lower limit and selectively setting the system load based on the comparison, and (iii) computing the time epoch based on the system load and a previous time epoch, and transfers, at the dynamically determined time epoch, the packet from the one of the static number of hold queues to the transmit queue for delivery to a network device via a downstream channel, wherein the control unit selectively sets the system load by setting the system load equal to the transmission time when the transmission time exceeds the constant lower limit.

25. The network device of claim 24, wherein the control unit selectively sets the system load by setting the system load equal to the constant lower limit when the constant lower limit exceeds the transmission time.

26. The network device of claim 24, wherein the control unit computes the time epoch by adding the system load to the previous time epoch.

27. The network device of claim 24, wherein the control unit further identifies service credits associated with the variable number of service flows, wherein the service credits represent a bandwidth allocation available for consumption by the variable number of service flows, and assigns the packets to the static number of hold queues based on the identified service credits.

28. The network device of claim 27, wherein the control unit further assigns initial packets associated with the variable number of service flows to the transmit queue.

29. The network device of claim 27, wherein the control unit assigns one of the packets by identifying a target queue state associated with one of the service flows, wherein the target queue state specifies a current priority level associated with the one of the service flows, and selecting one of the static number of hold queues based on the target queue state.

30. The network device of claim 29, wherein the control unit assigns one of the packets by comparing one of the service credits to the size of the one of the packets, and selectively assigning the one of the packets to the one of the static number of hold queues based on the comparisons.

31. The network device of claim 30, wherein the control unit selectively assigns one of the packets by assigning the one of the packets to the one of the static number of hold queues when the one of the service credits is greater than or equal to the size of the one of the packets.

32. The network device of claim 30, wherein the control unit adjusts the one of the service credits by subtracting the size of the one of the packets from the one of the service credits.

33. The network device of claim 30, wherein the control unit selectively assigns the one of the packets by comparing the one of the service credits to the size of the one of the packets, and selecting a different one of the static number of hold queues when the one of the service credits are less than the size of the one of the packets.

34. The network device of claim 33, wherein the control unit selects a different one of the static number of hold queues by adjusting the one of the service credits, and selecting the different one of the hold queues based on the adjusted one of the service credits.

35. The network device of claim 34, wherein the control unit adjusts the one of the service credits by:

defining a set of configurable service classes, pre-computing service quanta for each service class in the set, wherein the service quantum represents a pre-computed bandwidth adjustment for different network loading conditions, associating the one of the packets with one of the service classes, selecting one of the pre-computed service quanta based on the one of the service classes associated with the one of the packets and a current network loading condition, and adjusting the one of the service credits based on the selected one of the pre-computed service quanta.

36. The network device of claim 34, wherein the control unit identifies target queue states associated with the service flows, wherein the target queue states specify current priority levels associated with the service flows, and wherein the control unit adjusts the target queue states associated with the service flows to demote the target queue states one or more priority levels, and selects the different one or more of the static number of hold queues based on the adjusted target queue states.

37. The network device of claim 36, wherein the control unit adjusts, the target queue states by identifying service classes associated with the packets, monitoring the loading condition of the transmit queue, adjusting the service credits based on the determined service class and the monitored loading condition, and selecting the different one or more of the plurality of hold queues based on the adjusted service credits and the adjusted target queue states.

38. The network device of claim 37, wherein the control unit monitors the loading condition by monitoring the amount of data residing within the transmit queue.

39. The network device of claim 36, wherein the control unit compares the adjusted target queue states to a lowest priority level, and drops the packet when the adjusted target queue states are less than the lowest priority level.

40. The network device of claim 24, wherein the control unit transmits the packets via the downstream channel to the network device.

41. The network device of claim 40, wherein the control unit transmits the packets by assigning a queue state to each one of the static number of hold queues, wherein the queue state represents a priority level for the respective hold queue.

42. The network device of claim 41, wherein the control unit reassigns the queue state assigned to each one of the static number of hold queues in response to the time epoch.

43. The network device of claim 42, wherein the control unit reassigns the queue state by demoting the queue state of the highest priority one of the static number of hold queues to the queue state of the lowest priority one of the static number of hold queues, and promoting the queue states of the remaining hold queues by a priority level.

44. A system comprising:
a cable modem; and
a cable modem termination system comprising:
a downstream scheduler that includes a transmit queue,
a load monitor that monitors a loading condition of the transmit queue by monitoring an amount of data residing within the transmit queue and dynamically determines a time epoch based on the loading condition by (i) computing a transmission time to deliver the amount of data in the transmit queue, (ii) computing a system load in units of time by comparing the transmission time to a constant lower limit and selectively setting the system load based on the comparison, and (iii) computing the time epoch based on the system load and a previous time epoch,
wherein the load monitor selectively sets the system load by setting the system load equal to the transmission time when the transmission time exceeds the constant lower limit, and
a queue assignment module that stores a packet to one of a plurality of hold queues, and transfers, at the dynamically determined time epoch, the packet from the one of the plurality of hold queues to the transmit queue for delivery to the cable modem via a downstream channel.

45. The system of claim 44, wherein the load monitor selectively sets the system load by setting the system load equal to the constant lower limit when the constant lower limit exceeds the transmission time.

46. The system of claim 44, wherein the load monitor computes the time epoch by adding the system load to the previous time epoch.

47. The system of claim 44, wherein the queue assignment module associates the packet with a service flow, identifies a service credit associated with the service flow, wherein the service credit represents a bandwidth allocation available for consumption by the service flow, and assigns the packet to one of a plurality of hold queues based on the identified service credit.

48. The system of claim 47, wherein the queue assignment module assigns an initial packet associated with the service flow to the transmit queue.

49. The system of claim 47, wherein the queue assignment module further identifies a target queue state associated with the service flow, wherein the target queue state specifies a current priority level associated with the service flow, and selects one of the plurality of hold queues based on the target queue state.

50. The system of claim 49, wherein the queue assignment module adjusts the target queue state by identifying a service class associated with the packet, adjusting the service credit based on the determined service class and the loading condition monitored by the load monitor, and selecting the different one of the plurality of hold queues based on the adjusted service credit and the adjusted target queue state.

51. The system of claim 50, wherein the queue assignment module further compares the adjusted target queue state to a lowest priority level, and drops the packet when the adjusted target queue state is less than the lowest priority level.

52. The system of claim 47, wherein the queue assignment module further compares the service credit to the size of the packet, and selectively assigns the packet to one of the plurality of hold queues based on the comparison.

53. The system of claim 52, wherein the queue assignment module assigns the packet to one of the plurality of hold queues when the service credit is greater than or equal to the size of the packet.

54. The system of claim 53, wherein the queue assignment module adjusts the service credit upon assigning the packet by subtracting the size of the packet from the service credit.

55. The system of claim 54, wherein the queue assignment module compares the service credit to the size of the packet and selects a different one of the plurality of hold queues when the service credit is less than the size of the packet.

56. The system of claim 54, wherein the queue assignment module adjusts the service credit and selects a different one of the plurality of hold queues based on the adjusted service credit.

57. The system of claim 56, wherein the queue assignment module adjusts the service credit by:
defining a set of configurable service classes,
pre-computing service quanta for each service class in the set, wherein the service quantum represents a pre-computed bandwidth adjustment for different network loading conditions,
associating the packet with one of the service classes,
selecting one of the pre-computed service quanta based on the one of the service classes associated with the packet and a current network loading condition, and
adjusting the service credit based on the selected one of the pre-computed service quanta.

58. The system of claim 44, wherein the downstream scheduler further includes a queue transition module that assigns a queue state to each one of the plurality of hold queues, wherein the queue state represents a priority level for the respective hold queue.

59. The system of claim 58, wherein the queue transition module further reassigns the queue state assigned to each one of the plurality of hold queues in response to the time epoch generated by the load monitor.

60. The system of claim 59, wherein the queue transition module reassigns the queue state by demoting the queue state of the highest priority one of the plurality of hold queues to the queue state of the lowest priority one of the plurality of hold queues, and promoting the queue states of the remaining hold queues by a priority level.

61. The system of claim 44, wherein the downstream scheduler transmits the packet via a downstream channel to the cable modem.

* * * * *

UNITED STATES PATENT AND TRADEMARK OFFICE
CERTIFICATE OF CORRECTION

PATENT NO.       : 7,606,154 B1                                              Page 1 of 1
APPLICATION NO. : 10/816378
DATED            : October 20, 2009
INVENTOR(S)      : Chung-Chieh Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1594 days.

Signed and Sealed this

Fifth Day of October, 2010

David J. Kappos
*Director of the United States Patent and Trademark Office*